United States Patent [19]

Ricketts et al.

[11] Patent Number: 4,869,272
[45] Date of Patent: Sep. 26, 1989

[54] CLEANING SYSTEM FOR COMBINES

[75] Inventors: Jon E. Ricketts, Bolingbrook; James R. Lucas, Naperville; Robert A. Matousek, Minooka, all of Ill.

[73] Assignee: J. I. Case Company, Racine, Wis.

[21] Appl. No.: 188,898

[22] Filed: May 2, 1988

[51] Int. Cl.$^4$ ............................................. A01F 12/48
[52] U.S. Cl. ....................................... 460/100; 460/69
[58] Field of Search ...................... 56/14.6, 13.3, 16.5; 130/27 HF, 27 T, 27 R, 27 Z, DIG. 5

[56] References Cited

U.S. PATENT DOCUMENTS 4,230,130 10/1980 Staiert ............................... 130/27 T
4,250,897 2/1981 Glaser ................................ 130/27 Z
4,412,549 11/1983 Rowland-Hill .................... 130/27 T Primary Examiner—John Weiss
Attorney, Agent, or Firm—Dressler, Godsmith, Shore, Sutker & Milnamow, Ltd.

[57] ABSTRACT

An axial flow combine harvester incorporating a novel air flow system for separating grain from material other than grain. The system includes a cross-flow fan located at the exit end of the threshing cage which acts in conjunction with a cross-flow fan located adjacent the inlet end of the threshing cage to positively direct air past the cage to provide amore efficient separation of the grain from the chaff or straw.

5 Claims, 3 Drawing Sheets

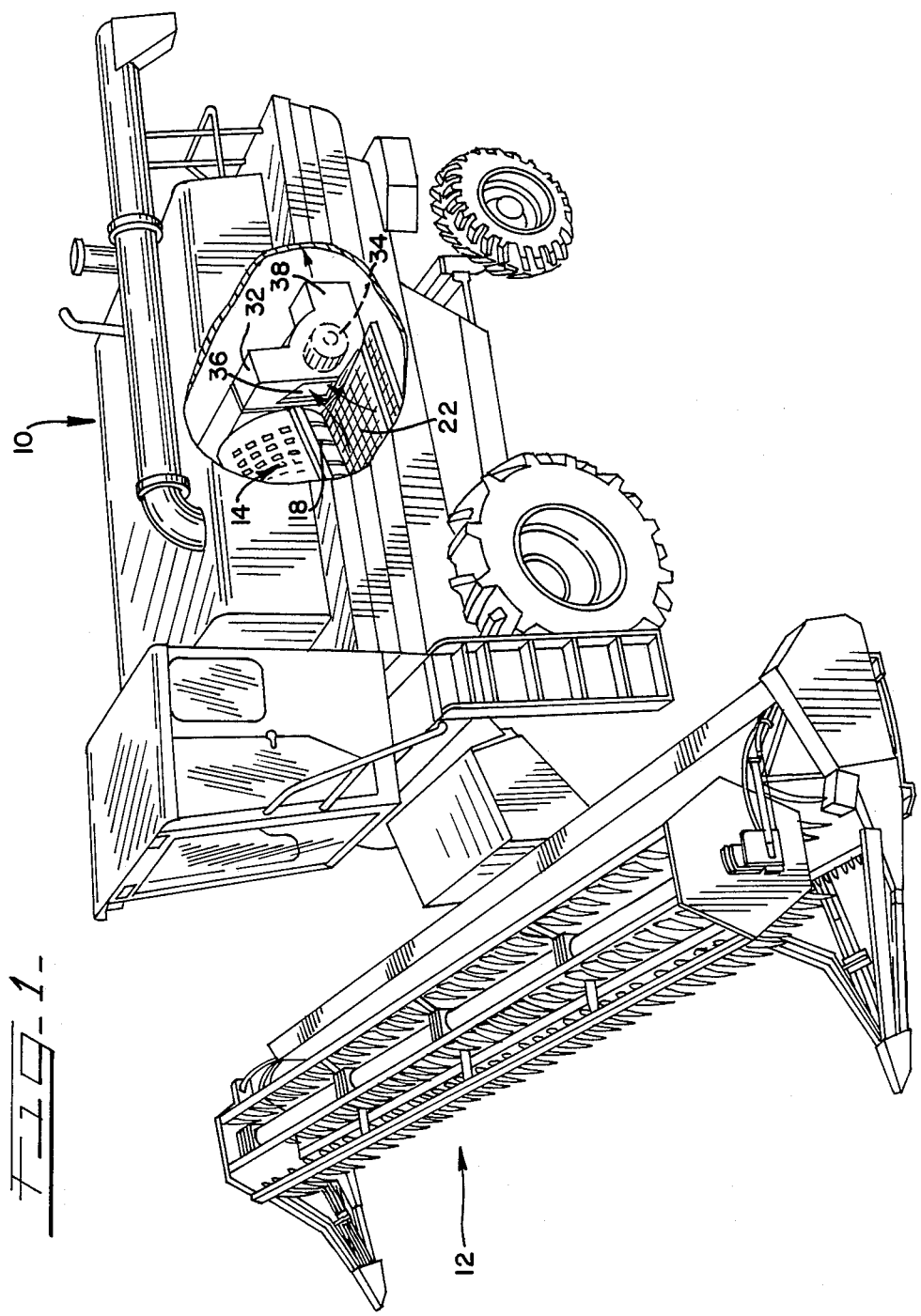

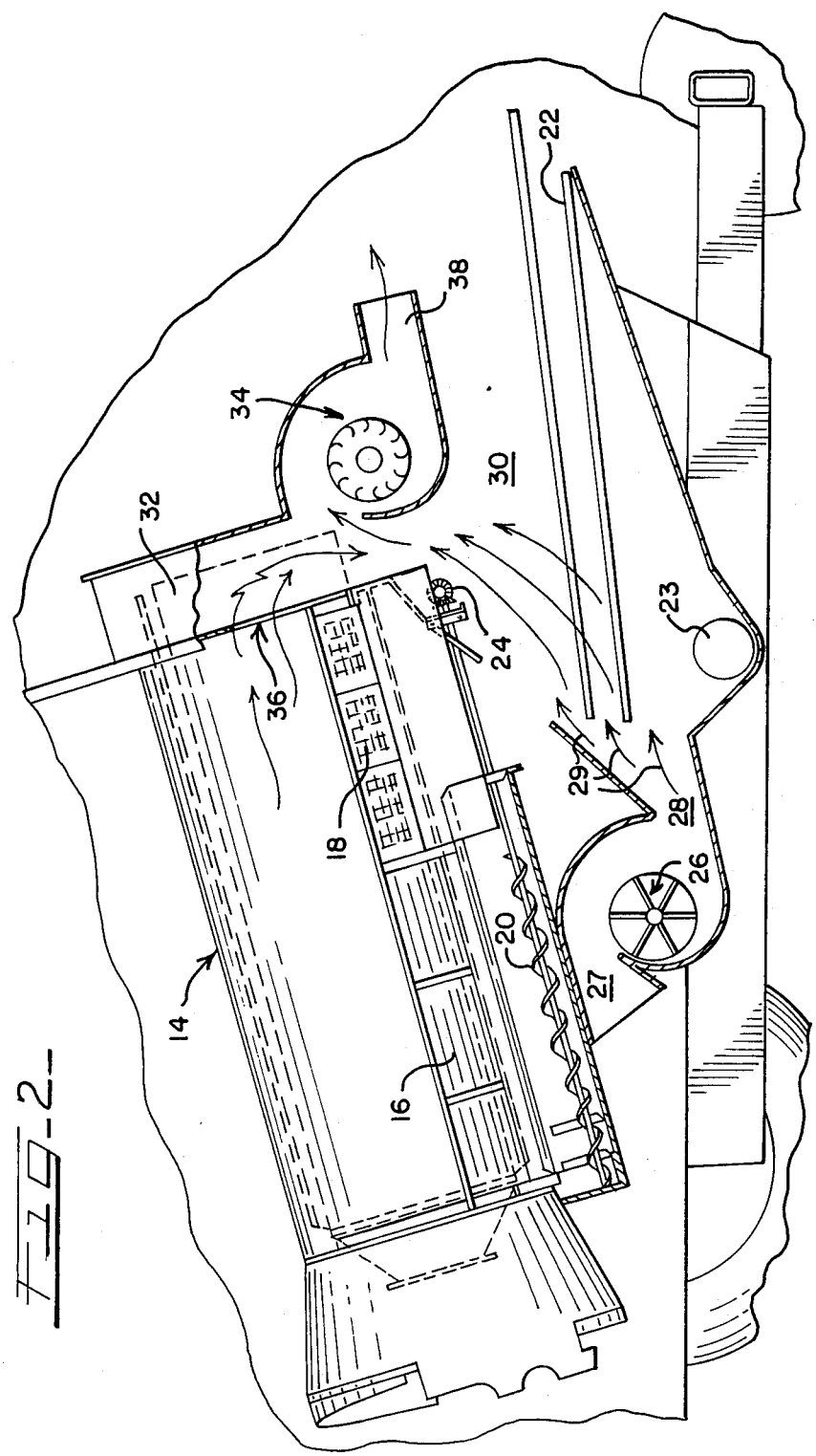

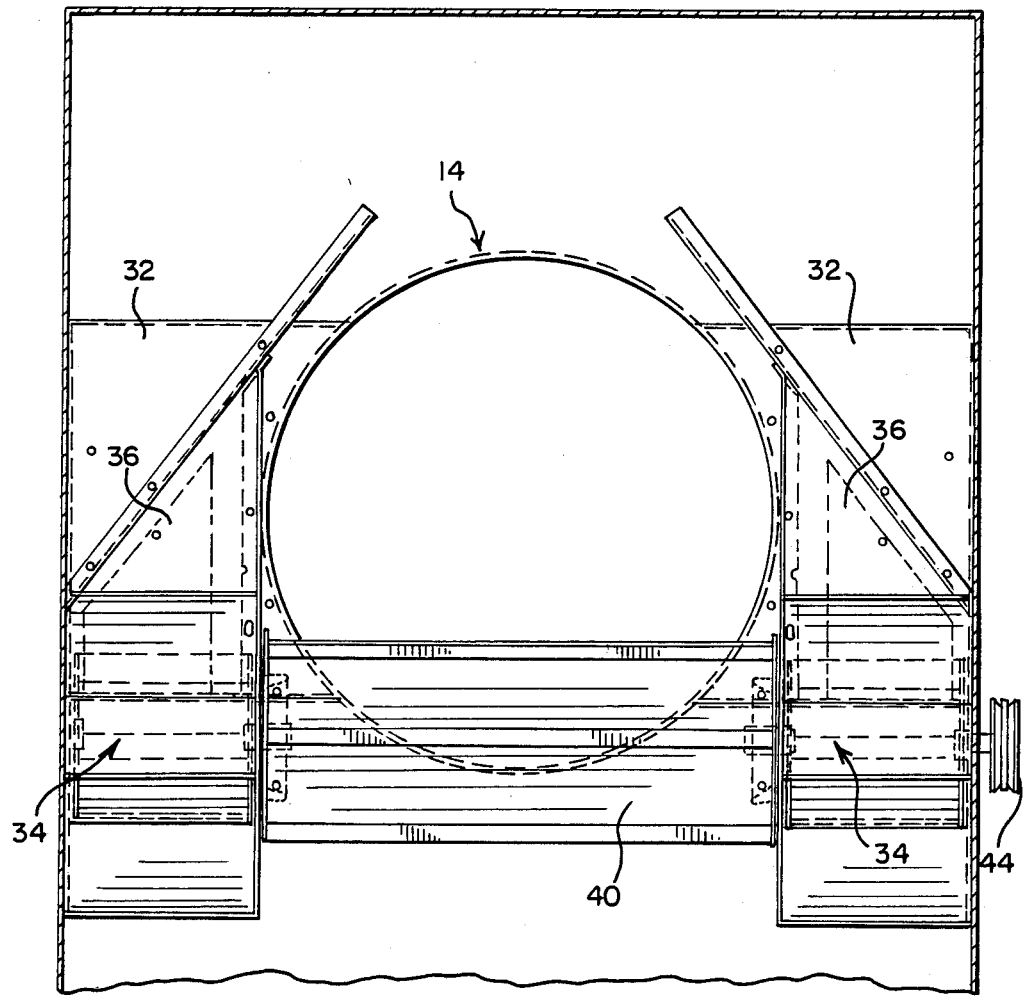
Fig-3-

CLEANING SYSTEM FOR COMBINES

This invention relates to a cleaning system for combines and more particularly to a multiple fan system located adjacent opposite ends of the cleaning system to increase the efficiency of separation of the grain from material other than grain.

BACKGROUND OF THE INVENTION

Axial flow combines are combines in which a power-driven rotor is mounted inside a stationary cylindrical threshing cage to thresh and separate the grain, and the material to be separated moves along the axis of the rotor. In such a combine, which has been available for a number of years, the grain is threshed several times repeatedly, but gently, as it spirals around the single large diameter rotor and passes through the threshing cage. A simple system of employing a rotor and a threshing cage incorporating concaves, separating grates and centrifugal force acts to separate the grain and material other than grain, and delivers the grain to the cleaning unit. The rotor threshes and acts to separate the grain from the material other than grain. Essentially, most material other than grain stays within the threshing cage and is directed out the rear end.

While the rotor and threshing cage act to separate a substantial portion of the grain from the material other than grain, some of the chaff or straw is directed out through openings in the cage along with the grain and a further separating action is required. Further separation is normally achieved by forcing a stream of air upwardly through the sieves located below the threshing cage and above the sieve so that the lighter material being expelled from the threshing cage is floated on top of the sieve and is directed out through the end of the combine by the air flow. The heavier seeds or grain tend to move to the sieve and fall through the sieve into a collector. It is clear from the above that an efficient flow of air is necessary to provide a proper cleaning action for threshed grain.

In existing cleaning systems found in axial flow combines, the cleaning function is adversely affected by the rotor air blowing down upon the cleaning system. That is to say that the centrifugal action of the rotor acts to direct turbulent air toward the cleaning and separating system which tends to agitate the material and thus possibly making some of the grain airborne, and subject to being wasted by discharging out the trailing end of the combine.

In the typical prior art combine, air is normally directed from a position below the threshing cage against the material other than grain and grain that is moving outwardly from the threshing cage. The lighter-weight material, other than grain, such as, chaff and straw, is carried along by the air flow and is directed out through the end of the combine, along with the residue that is located within the threshing cage. The residue within the cage is moved into engagement with beaters, or the like, and deposited on the ground at the trailing end of the combine. However, it can be appreciated that in a situation where turbulent air is directed outwardly by the centrifugal forces generated by the rotor into contact with the air being directed by the fan located adjacent the threshing cage surface, this mixture of air flows could adversely affect the flow of the grain down into the cleaning sieves and the grain collecting area.

In accordance with the present invention, there are provided a pair of fans located adjacent the beater disposed at the end of the threshing cage, which fans draw air into an inlet opening in a housing in which the fan is located. With this novel arrangement, a relatively strong current of air is moved along the outer surface of the threshing cage toward the end of the threshing cage which acts to offset the adverse effect of the turbulent air being expelled from the threshing gage. This increases the efficiency of the cleaning system by directing an increased percentage of the material other than grain out of the grain pan and sieve area.

It is noted that the ends of the discharge beater, which is located at the end of the threshing cage, does not do any significant propelling of the rotor discharge out the rear thereof, and thus locating fans adjacent the end of the beater does not significantly impact on the discharge of the material other than grain out the rear of the threshing cage.

In summation, the advantages of locating the fans adjacent the end of the threshing cage to increase the efficiency of the cleaning action are numerous and they include (1) eliminating the adverse effects of the rotor air on the cleaning system, (2) act to eliminate more of the material other than grain from the cleaning system, (3) reduce cleaning system losses, (4) improve the airflow through and above the cleaning system, (5) improve the spreading of the material other than grain, (6) reduce the cleaning system air turbulence by creating a smooth upper surface for air to flow along, and (7) the sieves for separating the grain from the chaff stay cleaner and work better.

Other advantages of the invention will be seen from the following description taken in conjunction with the drawings, in which:

FIG. 1 illustrates a perspective view partially broken away of a combine;

FIG. 2 is a cross-sectional view showing the cleaning system of the combine; and FIG. 3 is an end view of the cleaning system of the combine.

Referring first to FIG. 1, there is shown a combine 10 which has at the front end thereof a header 12 which can be of any design and in the instant case illustrates a flexible cutter bar header for soy beans, which header cuts and directs material into a threshing cage 14. The combine is operatively powered by an engine (not shown) suitably housed therein to provide driving power for the combine and the harvesting apparatus mounted thereon and described below. The transfer of rotational power from the engine to the various driven components is of a conventional nature and could include fixed or variable belt or chain drives that have not been shown in the drawings for purposes of clarity. Located within the threshing cage is a coaxially disposed rotor (not shown) which acts to direct the material to be threshed from the inlet end of the combine to the exit end, wherein the grain is threshed several times repeatedly but gently as it spirals around the single large diameter rotor and passes through the threshing cage. Disposed about the rotor is a simple system of concaves 16 and separating grates 18 which through the action of the rotor and centrifugal force act to separate the grain from the majority of material other than grain and deliver such material to the cleaning unit. Also not shown is an impeller located at the front of the rotor which draws crop and air into the rotor and threshing cage.

As shown more particularly in FIG. 2, there are shown augers 20 for moving grain to the cleaning sieves 22 that are oscillated to separate the grain from material other than grain and the grain falls through the sieves to a clean grain collecting auger 23 which directs the grain into a hopper (not shown).

The drive mechanism 24 is part of that used to drive the augers and sieves. This mechanism is conventional and further details thereof are not important to an understanding of the present invention.

Located below the auger 20 for moving grain to the sieves 22 is a cross-flow cleaning fan 26 which takes air into the inlet 27 and directs it outwardly and upwardly through the outlet 28, as shown by arrows 29 for separating the material other than grain from the grain and to carry it out through the chamber 30 to an exit from the combine. The material other than grain, such as, chaff and straw, is lighter than the grain and the air stream directed upwardly and outwardly by the fan 26 acts to carry the lighter chaff and straw in a direction parallel to the threshing cage and out the end of the combine. Up to this point, conventional mechanisms have been described and are currently found on existing combines.

However, as previously mentioned, with this type of cleaning system it is not as efficient as combine operators would like. With the large combines of today, it is essential to provide a greater capacity or throughput, and to accomplish this a proper airflow to make the residue airborne in a highly efficient manner becomes more critical.

In order to increase the efficiency of the cleaning system, the present invention is employed. Before describing it, it is to be noted that the centrifugal action of the rotor within the threshing cage results in turbulent air being forced outwardly through the threshing cage, which air flow commingles with the air flowing from the cross-flow fan 26. The air currents created by the centrifugal action from the rotor acts to force more of the material other than grain onto the sieves 22, which obviously acts to impair the efficiency of the sieves 22. It can be appreciated if that this air is directed away from the sieves, the sieves would be kept cleaner of chaff, or the like, and thus the separating action by the sieves would be more efficient.

In order to provide for the desired air flow within the chamber 30, applicant's invention consisting of cross-flow fans 34 located adjacent the ends of the threshing cage 14 are provided. These fans have relatively high velocity for good chaff distribution. These fans are disposed in housings 32 which have inlet openings 36 adjacent the outer surface of the threshing cage 14, in the area above the cleaning system, or both combinations together. These fans in effect pull air and entrained material into the inlet 36 of the housings 32, which air and entrained material is directed out of the outlets 38. The pulling of air into housing 32 acts to direct the air coming from the fan 26 and air coming from the rotor, past the outer surface of the threshing cage 14 to minimize the impact of the air being forced out of the threshing cage 14 by the action of the rotor within the threshing cage 14. In effect, it essentially eliminates or at least substantially reduces the air being moved out of the threshing cage from acting to force the material other than grain onto the sieves. This air, which is being directed from the fan 26 through the chamber 30 into the opening 36 of the housing 32 acts to carry with it a higher percentage of the material other than grain than would otherwise occur if these fans were not present, and thus increases the separating and cleaning efficiency of the system.

The material that is directed out through the housing outlet 38 flows along with the chaff and straw that is moved out of the threshing cage 14 by the rotor onto the beater 40 located at the end of the threshing cage 14, as seen in FIG. 3.

It is to be noted that the threshing cage and fans are located on a common axis driven by a belt drive 44, but it is noted that this is but one system that could be employed. For example, the fans could be driven independently of the beater 40. Also, while a beater 40 is illustrated, it could be a chopper, or other device normally employed at the exit end of an axially directed rotor of a combine.

Accordingly, it is intended to cover by the appended claims all such modifications that fall within the true spirit and scope of the invention.

What is claimed is:

1. In a combine harvester for cleaning threshed grain including an auger mounted for rotation about an axis of rotation and located within a threshing cage having an inlet end for receiving material to be threshed and an outlet for residue, separating means disposed generally parallel to said cage, sieve means spaced from said separating means, a first fan means mounted adjacent said threshing cage to create air flow in a direction generally parallel to the axis of said threshing cage and through said sieve means to urge material other than threshed grain into an airborne state toward the outlet end of said threshing cage for discharging said material from said combine harvester, beater means located at the end of the threshing cage on a first axis, and second fan means disposed adjacent the perimeter of the outlet end of said threshing cage coaxial with said beater consisting of separate fans located on diametrically opposite sides of said threshing cage for directing the air flow from said first fan means toward the outlet end of said threshing cage to increase the separating action of the grain from the material other than grain.

2. In a combine harvester as set forth in claim 1 in which each of said separate fans is located in housings located at the outlet end of the threshing cage, said housings having an inlet opening disposed above said sieve means and adjacent the outer surface of said cage and an outlet downstream thereof.

3. In a combine harvester as set forth in claim 2 in which there are beater means located at the outlet of the threshing cage and the second fan means are located at the ends of the beater means.

4. In a combine harvester as set forth in claim 3 in which the beater means and second fan means are coaxial and have a common drive means.

5. In a combine harvester as set forth in claim 4 in which the first and second fan means consists of cross-flow fans.

* * * * *